(12) United States Patent
Chandrasekaran et al.

(10) Patent No.: US 8,125,205 B2
(45) Date of Patent: Feb. 28, 2012

(54) POWER CONVERTER EMPLOYING REGULATORS WITH A COUPLED INDUCTOR

(75) Inventors: Sriram Chandrasekaran, Round Rock, TX (US); Raymond George Mayer, Parker, TX (US)

(73) Assignee: Flextronics International USA, Inc., San Jose, CA (US)

( * ) Notice: Subject to any disclaimer, the term of this patent is extended or adjusted under 35 U.S.C. 154(b) by 773 days.

(21) Appl. No.: 11/847,450

(22) Filed: Aug. 30, 2007

(65) Prior Publication Data

US 2008/0054874 A1 Mar. 6, 2008

Related U.S. Application Data

(60) Provisional application No. 60/841,454, filed on Aug. 31, 2006.

(51) Int. Cl.
*G05F 1/40* (2006.01)
(52) U.S. Cl. ....................................... 323/282
(58) Field of Classification Search .................. 323/222, 323/262, 265, 272, 282
See application file for complete search history.

(56) References Cited

U.S. PATENT DOCUMENTS

| | | | |
|---|---|---|---|
| 1,376,978 A | 5/1921 | Stoekle | |
| 3,346,798 A * | 10/1967 | Dinger | 363/56.03 |
| 3,358,210 A | 12/1967 | Grossoehme | |
| 3,433,998 A | 3/1969 | Woelber | |
| 3,553,620 A | 1/1971 | Cielo et al. | |
| 3,622,868 A | 11/1971 | Todt | |
| 3,681,679 A | 8/1972 | Chung | |
| 3,708,744 A | 1/1973 | Stephens et al. | |
| 4,019,122 A | 4/1977 | Ryan | |
| 4,075,547 A | 2/1978 | Wroblewski | |
| 4,327,348 A | 4/1982 | Hirayama | |
| 4,471,423 A | 9/1984 | Hase | |
| 4,499,481 A | 2/1985 | Greene | |
| 4,570,174 A | 2/1986 | Huang et al. | |
| 4,577,268 A | 3/1986 | Easter et al. | |

(Continued)

FOREIGN PATENT DOCUMENTS

EP  0 665 634 A1  1/1994

(Continued)

OTHER PUBLICATIONS

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

(Continued)

*Primary Examiner* — Adolf Berhane
(74) *Attorney, Agent, or Firm* — Slater & Matsil, L.L.P.

(57) ABSTRACT

A power converter includes a power train with a coupled inductor and a plurality of regulators, and method of forming and operating the same. In one embodiment, the power train includes a coupled inductor including a magnetic core with a common leg, a first leg and a second leg. The coupled inductor also includes a common winding formed around the common leg, and first and second windings. The first winding is formed around the first leg, and is electrically and magnetically coupled to the common winding. The second winding is formed around the second leg, and is electrically and magnetically coupled to the common winding. The power train also includes a first regulator including a first main switch coupled to the first winding and a second regulator including a second main switch coupled to the second winding.

40 Claims, 7 Drawing Sheets

U.S. PATENT DOCUMENTS

| | | | |
|---|---|---|---|
| 4,581,691 A | 4/1986 | Hock | |
| 4,636,823 A | 1/1987 | Margalit et al. | |
| 4,660,136 A | 4/1987 | Montorefano | |
| 4,803,609 A | 2/1989 | Gillett et al. | |
| 4,823,249 A | 4/1989 | Garcia, II | |
| 4,887,061 A | 12/1989 | Matsumura | |
| 4,899,271 A | 2/1990 | Seiersen | |
| 4,903,089 A | 2/1990 | Hollis et al. | |
| 4,922,400 A | 5/1990 | Cook | |
| 4,962,354 A | 10/1990 | Visser et al. | |
| 4,999,759 A | 3/1991 | Cavagnolo et al. | |
| 5,003,277 A | 3/1991 | Sokai et al. | |
| 5,027,264 A | 6/1991 | DeDoncker et al. | |
| 5,068,756 A | 11/1991 | Morris et al. | |
| 5,106,778 A | 4/1992 | Hollis et al. | |
| 5,126,714 A | 6/1992 | Johnson | |
| 5,132,888 A | 7/1992 | Lo et al. | |
| 5,134,771 A | 8/1992 | Lee et al. | |
| 5,177,460 A | 1/1993 | Dhyanchand et al. | |
| 5,182,535 A | 1/1993 | Dhyanchand | |
| 5,204,809 A * | 4/1993 | Andresen | 363/132 |
| 5,206,621 A | 4/1993 | Yerman | |
| 5,208,739 A * | 5/1993 | Sturgeon | 363/24 |
| 5,223,449 A | 6/1993 | Morris et al. | |
| 5,231,037 A | 7/1993 | Yuan et al. | |
| 5,244,829 A | 9/1993 | Kim | |
| 5,291,382 A | 3/1994 | Cohen | |
| 5,303,138 A | 4/1994 | Rozman | |
| 5,305,191 A | 4/1994 | Loftus, Jr. | |
| 5,335,163 A | 8/1994 | Seiersen | |
| 5,336,985 A | 8/1994 | McKenzie | |
| 5,342,795 A | 8/1994 | Yuan et al. | |
| 5,353,001 A | 10/1994 | Meinel et al. | |
| 5,369,042 A | 11/1994 | Morris et al. | |
| 5,374,887 A | 12/1994 | Drobnik | |
| 5,399,968 A | 3/1995 | Sheppard et al. | |
| 5,407,842 A | 4/1995 | Morris et al. | |
| 5,468,661 A | 11/1995 | Yuan et al. | |
| 5,508,903 A | 4/1996 | Alexndrov | |
| 5,554,561 A | 9/1996 | Plumton | |
| 5,555,494 A | 9/1996 | Morris | |
| 5,610,085 A | 3/1997 | Yuan et al. | |
| 5,624,860 A | 4/1997 | Plumton et al. | |
| 5,663,876 A | 9/1997 | Newton et al. | |
| 5,700,703 A | 12/1997 | Huang et al. | |
| 5,712,189 A | 1/1998 | Plumton et al. | |
| 5,719,544 A | 2/1998 | Vinciarelli et al. | |
| 5,734,564 A | 3/1998 | Brkovic | |
| 5,736,842 A | 4/1998 | Jovanovic | |
| 5,742,491 A | 4/1998 | Bowman et al. | |
| 5,747,842 A | 5/1998 | Plumton | |
| 5,756,375 A | 5/1998 | Celii et al. | |
| 5,760,671 A | 6/1998 | Lahr et al. | |
| 5,783,984 A | 7/1998 | Keuneke | |
| 5,784,266 A | 7/1998 | Chen | |
| 5,804,943 A | 9/1998 | Kollman et al. | |
| 5,815,386 A | 9/1998 | Gordon | |
| 5,864,110 A | 1/1999 | Moriguchi et al. | |
| 5,870,299 A | 2/1999 | Rozman | |
| 5,886,508 A | 3/1999 | Jutras | |
| 5,889,298 A | 3/1999 | Plumton et al. | |
| 5,889,660 A | 3/1999 | Taranowski et al. | |
| 5,900,822 A | 5/1999 | Sand et al. | |
| 5,909,110 A | 6/1999 | Yuan et al. | |
| 5,910,665 A | 6/1999 | Plumton et al. | |
| 5,920,475 A | 7/1999 | Boylan et al. | |
| 5,925,088 A | 7/1999 | Nasu | |
| 5,933,338 A | 8/1999 | Wallace | |
| 5,940,287 A | 8/1999 | Brkovic | |
| 5,956,245 A | 9/1999 | Rozman | |
| 5,956,578 A | 9/1999 | Weitzel et al. | |
| 5,959,850 A | 9/1999 | Lim | |
| 5,999,066 A | 12/1999 | Saito et al. | |
| 6,003,139 A | 12/1999 | McKenzie | |
| 6,008,519 A | 12/1999 | Yuan et al. | |
| 6,011,703 A | 1/2000 | Boylan et al. | |
| 6,038,154 A | 3/2000 | Boylan et al. | |
| 6,060,943 A | 5/2000 | Jansen | |
| 6,067,237 A | 5/2000 | Nguyen | |
| 6,069,798 A | 5/2000 | Liu | |
| 6,069,799 A | 5/2000 | Bowman et al. | |
| 6,084,792 A | 7/2000 | Chen et al. | |
| 6,094,038 A | 7/2000 | Lethellier | |
| 6,097,046 A | 8/2000 | Plumton | |
| 6,144,187 A | 11/2000 | Bryson | |
| 6,147,886 A | 11/2000 | Wittenbreder | |
| 6,156,611 A | 12/2000 | Lan et al. | |
| 6,163,466 A | 12/2000 | Davila, Jr. et al. | |
| 6,181,231 B1 | 1/2001 | Bartilson | |
| 6,188,586 B1 | 2/2001 | Farrington et al. | |
| 6,191,964 B1 | 2/2001 | Boylan et al. | |
| 6,208,535 B1 | 3/2001 | Parks | |
| 6,215,290 B1 | 4/2001 | Yang et al. | |
| 6,218,891 B1 | 4/2001 | Lotfi et al. | |
| 6,229,197 B1 | 5/2001 | Plumton et al. | |
| 6,262,564 B1 | 7/2001 | Kanamori | |
| 6,288,920 B1 | 9/2001 | Jacobs et al. | |
| 6,309,918 B1 | 10/2001 | Huang et al. | |
| 6,320,490 B1 | 11/2001 | Clayton | |
| 6,323,090 B1 | 11/2001 | Zommer | |
| 6,325,035 B1 | 12/2001 | Codina et al. | |
| 6,344,986 B1 | 2/2002 | Jain et al. | |
| 6,348,848 B1 | 2/2002 | Herbert | |
| 6,351,396 B1 | 2/2002 | Jacobs | |
| 6,356,462 B1 | 3/2002 | Jang et al. | |
| 6,362,986 B1 * | 3/2002 | Schultz et al. | 363/132 |
| 6,373,727 B1 | 4/2002 | Hedenskog et al. | |
| 6,373,734 B1 | 4/2002 | Martinelli | |
| 6,380,836 B2 | 4/2002 | Matsumoto et al. | |
| 6,388,898 B1 | 5/2002 | Fan et al. | |
| 6,392,902 B1 | 5/2002 | Jang et al. | |
| 6,414,578 B1 | 7/2002 | Jitaru | |
| 6,462,965 B1 | 10/2002 | Uesono | |
| 6,469,564 B1 | 10/2002 | Jansen | |
| 6,477,065 B2 | 11/2002 | Parks | |
| 6,483,724 B1 | 11/2002 | Blair et al. | |
| 6,489,754 B2 | 12/2002 | Blom | |
| 6,498,367 B1 | 12/2002 | Chang et al. | |
| 6,501,193 B1 | 12/2002 | Krugly | |
| 6,504,321 B2 | 1/2003 | Giannopoulos et al. | |
| 6,512,352 B2 | 1/2003 | Qian | |
| 6,525,603 B1 | 2/2003 | Morgan | |
| 6,539,299 B2 | 3/2003 | Chatfield et al. | |
| 6,545,453 B2 | 4/2003 | Glinkowski et al. | |
| 6,549,436 B1 | 4/2003 | Sun | |
| 6,552,917 B1 | 4/2003 | Bourdillon | |
| 6,654,259 B2 | 11/2003 | Koshita et al. | |
| 6,661,276 B1 | 12/2003 | Chang | |
| 6,683,797 B2 | 1/2004 | Zaitsu et al. | |
| 6,696,910 B2 | 2/2004 | Nuytkens et al. | |
| 6,731,486 B2 | 5/2004 | Holt et al. | |
| 6,741,099 B1 | 5/2004 | Krugly | |
| 6,753,723 B2 | 6/2004 | Zhang | |
| 6,765,810 B2 | 7/2004 | Perry | |
| 6,775,159 B2 | 8/2004 | Webb et al. | |
| 6,784,644 B2 * | 8/2004 | Xu et al. | 323/225 |
| 6,831,847 B2 | 12/2004 | Perry | |
| 6,867,678 B2 | 3/2005 | Yang | |
| 6,873,237 B2 | 3/2005 | Chandrasekaran et al. | |
| 6,944,033 B1 | 9/2005 | Xu et al. | |
| 6,980,077 B1 | 12/2005 | Chandrasekaran et al. | |
| 6,982,887 B2 | 1/2006 | Batarseh et al. | |
| 7,012,414 B1 | 3/2006 | Mehrotra et al. | |
| 7,026,807 B2 | 4/2006 | Anderson et al. | |
| 7,034,586 B2 | 4/2006 | Mehas et al. | |
| 7,034,647 B2 | 4/2006 | Yan et al. | |
| 7,046,523 B2 | 5/2006 | Sun et al. | |
| 7,061,358 B1 | 6/2006 | Yang | |
| 7,076,360 B1 | 7/2006 | Ma | |
| 7,148,669 B2 | 12/2006 | Maksimovic et al. | |
| 7,170,268 B2 * | 1/2007 | Kim | 323/272 |
| 7,176,662 B2 | 2/2007 | Chandrasekaran | |
| 7,209,024 B2 | 4/2007 | Nakahori | |
| 7,280,026 B2 | 10/2007 | Chandrasekaran et al. | |
| 7,285,807 B2 | 10/2007 | Brar et al. | |
| 7,298,118 B2 * | 11/2007 | Chandrasekaran | 323/222 |
| 7,321,283 B2 | 1/2008 | Mehrotra et al. | |

| | | |
|---|---|---|
| 7,332,992 B2 | 2/2008 | Iwai |
| 7,339,208 B2 | 3/2008 | Brar et al. |
| 7,375,607 B2 | 5/2008 | Lee et al. |
| 7,385,375 B2 | 6/2008 | Rozman |
| 7,417,875 B2 | 8/2008 | Chandrasekaran et al. |
| 7,427,910 B2 | 9/2008 | Mehrotra et al. |
| 7,468,649 B2 | 12/2008 | Chandrasekaran |
| 7,489,225 B2 | 2/2009 | Dadafshar |
| 7,554,430 B2 | 6/2009 | Mehrotra et al. |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,889,517 B2 | 2/2011 | Artusi et al. |
| 7,906,941 B2 | 3/2011 | Jayaraman et al. |
| 2002/0114172 A1 | 8/2002 | Webb et al. |
| 2003/0026115 A1 | 2/2003 | Miyazaki |
| 2003/0197585 A1 | 10/2003 | Chandrasekaran et al. |
| 2003/0198067 A1 | 10/2003 | Sun et al. |
| 2004/0017689 A1 | 1/2004 | Zhang et al. |
| 2004/0034555 A1 | 2/2004 | Dismukes et al. |
| 2004/0148047 A1 | 7/2004 | Dismukes et al. |
| 2004/0156220 A1 | 8/2004 | Kim et al. |
| 2005/0024179 A1 | 2/2005 | Chandrasekaran et al. |
| 2005/0245658 A1 | 11/2005 | Mehrotra et al. |
| 2005/0281058 A1 | 12/2005 | Batarseh et al. |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0237968 A1 | 10/2006 | Chandrasekaran |
| 2006/0255360 A1 | 11/2006 | Brar et al. |
| 2007/0007945 A1 | 1/2007 | King et al. |
| 2007/0045765 A1 | 3/2007 | Brar et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0222463 A1 | 9/2007 | Qahouq et al. |
| 2007/0241721 A1 | 10/2007 | Weinstein et al. |
| 2007/0296028 A1 | 12/2007 | Brar et al. |
| 2007/0298559 A1 | 12/2007 | Brar et al. |
| 2007/0298564 A1 | 12/2007 | Brar et al. |
| 2008/0024259 A1 | 1/2008 | Chandrasekaran et al. |
| 2008/0130321 A1 | 6/2008 | Artusi et al. |
| 2008/0130322 A1 | 6/2008 | Artusi et al. |
| 2008/0150666 A1 | 6/2008 | Chandrasekaran et al. |
| 2008/0224812 A1 | 9/2008 | Chandrasekaran |
| 2008/0232141 A1 | 9/2008 | Artusi et al. |
| 2008/0315852 A1 | 12/2008 | Jayaraman et al. |
| 2008/0316779 A1 | 12/2008 | Jayaraman et al. |
| 2009/0027926 A1 | 1/2009 | Yang et al. |
| 2009/0046486 A1 | 2/2009 | Lu et al. |
| 2009/0109711 A1 | 4/2009 | Hsu |
| 2009/0257250 A1 | 10/2009 | Liu |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |
| 2010/0182806 A1 | 7/2010 | Garrity et al. |
| 2010/0188876 A1 | 7/2010 | Garrity et al. |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0038179 A1 | 2/2011 | Zhang |
| 2011/0134664 A1 | 6/2011 | Berghegger |

FOREIGN PATENT DOCUMENTS

| | | |
|---|---|---|
| JP | 3-215911 | 9/1991 |
| JP | 2000-68132 | 3/2000 |
| WO | WO 2010/114914 A1 | 10/2010 |

OTHER PUBLICATIONS

Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

Curtis, K., "Advances in Microcontroller Peripherals Facilitate Current-Mode for Digital Power Supplies," Digital Power Forum '06, 4 pp., Sep. 2006, Darnell Group, Richardson, TX.

Eisenbeiser, K., et al., "Manufacturable GaAs VFET for Power Switching Applications," IEEE Electron Device Letters, Apr. 2000, pp. 144-145, vol. 21, No. 4, IEEE.

Gaye, M., et al., "A 50-100MHz 5V to –5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.

Jitaru, I.D., et al., "Quasi-Integrated Magnetic An Avenue for Higher Power Density and Efficiency in Power Converters," Twelfth Annual Applied Power Electronics Conference and Exposition, Feb. 23-27, 1997, pp. 395-402, vol. 1, IEEE, Los Alamitos, CA.

Kollman, R., et al., "10 MHz PWM Converters with GaAs VFETs," IEEE Eleventh Annual Applied Power Electronics Conference and Exposition, Mar. 1996, pp. 264-269, vol. 1, IEEE.

Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.

Lenk, R., "Introduction to the Tapped Buck Converter," PCIM 2000, HFPC 2000 Proceedings, Oct. 2000, pp. 155-166.

Liu, W., "Fundamentals of III-V Devices: HBTs, MESFETs, and HFETs/HEMTs," §5-5: Modulation Doping, 1999, pp. 323-330, John Wiley & Sons, New York, NY.

Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.

Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.

Miwa, B.A., et al., "High Efficiency Power Factor Correction Using Interleaving Techniques," IEEE Proceedings of APEC, 1992, pp. 557-568, IEEE, Los Alamitos, CA.

Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual, IEEE Power Electronics Specialists Conference, Jun. 1996, pp. 861-867, vol. 1, IEEE.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

Pietkiewicz, A., et al. "Coupled-Inductor Current-Doubler Topology in Phase-Shifted Full-Bridge DC-DC Converter," Proceedings of INTELEC '98, 1998, 9 pp., Paper 2-3, IEEE, Los Alamitos, CA.

Plumton, D.L., et al., "A Low On-Resistance High-Current GaAs Power VFET," IEEE Electron Device Letters, Apr. 1995, pp. 142-144, vol. 16, No. 4, IEEE.

Rajeev, M., "An Input Current Shaper with Boost and Flyback Converter Using Integrated Magnetics," Power Electronics and Drive Systems, Fifth International Conference on Power Electronics and Drive Systems 2003, Nov. 17-20, 2003, pp. 327-331, vol. 1, IEEE, Los Alamitos, CA.

Rico, M., et al., "Static and Dynamic Modeling of Tapped-Inductor DC-to-DC Converters," 1987, pp. 281-288, IEEE, Los Alamitos, CA.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Wei, J., et al., "Comparison of Three Topology Candidates for 12V VRM," IEEE APEC, 2001, pp. 245-251, IEEE, Los Alamitos, CA.

Weitzel, C.E., "RF Power Devices for Wireless Communications," 2002 IEEE MTT-S CDROM, 2002, pp. 285-288, paper TU4B-1, IEEE, Los Alamitos, CA.

Williams, R., "Modern GaAs Processing Methods," 1990, pp. 66-67, Artech House, Inc., Norwood, MA.

Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Chhawchharia, P., et al., "On the Reduction of Component Count in Switched Capacitor DC/DC Convertors," Hong Kong Polytechnic University, IEEE, 1997, Hung Hom, Kowloon, Hong King pp. 1395-1401.

Kuwabara, K., et al., "Switched-Capacitor DC-DC Converters," Fujitsu Limited, IEEE, 1988, Kawasaki, Japan, pp. 213-218.

Maxim, Application Note 725, www.maxim-ic.com/an725, Maxim Integrated Products, Nov. 29, 2001, 8 pages.

National Semiconductor Corporation, "LMC7660 Switched Capacitor Voltage Converter," www.national.com, Apr. 1997, 12 pages.

National Semiconductor Corporation, "LM2665 Switched Capacitor Voltage Converter," www.national.com, Sep. 2005, 9 pages.

Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.

Texas Instruments Incorporated, "LT1054, LT1054Y Switched-Capacitor Voltage Converters With Regulators," SLVS033C, Feb. 1990—Revised Jul. 1998, 25 pages.

Vallamkonda, S., "Limitations of Switching Voltage Regulators," A Thesis in Electrical Engineering, Texas Tech University, May 2004, 89 pages.

Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

"Implementing a Digital AC/DC Switched-Mode Power Supply Using a 56F8300 Digital Signal Controller" Freescale Semiconductor, Inc., Application Note AN3115, Aug. 2005 (pp. 1-24).

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

* cited by examiner

PEAK TO PEAK OF SAWTOOTH SWITCHING RIPPLE CURRENT (A)

LOW LINE
$V_{in}$ = 90V

LINE CYCLE →

POWER CONVERTER EMPLOYING REGULATORS WITH A COUPLED INDUCTOR

This application claims the benefit of U.S. Provisional Application No. 60/841,454, entitled "Power Converter with Coupled Boost Inductor," filed on Aug. 31, 2006, which is incorporated herein by reference.

TECHNICAL FIELD

The present invention is directed, in general, to electronic power conversion and, more specifically, to a power converter including regulators with a coupled inductor, and a method of forming and operating the same.

BACKGROUND

A switch-mode power converter (also referred to as a "power converter") is a power supply or power processing circuit that converts an input voltage waveform into a specified output voltage waveform. Controllers associated with the power converters manage an operation thereof by controlling the conduction periods of switches employed therein. Generally, the controllers are coupled between an input and output of the power converter in a feedback loop configuration.

A power converter frequently employs a boost switching regulator topology (also referred to as a "boost regulator" or a "boost topology") to convert the input voltage waveform into the specified output voltage waveform at a higher voltage level. A boost regulator is commonly used in powering applications that are coupled to an ac mains wherein a rectified input voltage is to be boosted by the boost regulator to produce a dc output voltage higher than the peak value of the ac input voltage or input line voltage supplied thereto.

A conventional single-switch boost regulator is often a configuration of choice in single-phase applications such as line conditioners because the regulator can process an ac input current or input line current with a high power factor. Power factor is a measure of the real power drawn from the mains in watts as a proportion of the apparent volt-amperes supplied. The apparent volt-amperes is the vector sum of the real and reactive power. Unity power factor, therefore, means that the apparent volt-amperes is equal in magnitude to the real power or the reactive power is zero. In ac mains applications where the input line voltage is ideally sinusoidal, achieving unity power factor requires the input line current drawn by the power converter to be controlled to be sinusoidal and aligned in phase with the input line voltage. In these applications, the boost regulator processes the ac input voltage (e.g., 90 volts to 265 volts root mean square ("rms")) and produces a dc output voltage (e.g., 400 volts), while drawing a substantially sinusoidal input line current aligned with the waveform of the ac input voltage. At a high line voltage of 265 volts, the peak line voltage is roughly 375 volts. Thus, a dc output voltage of 400 volts provides a modest margin for the output voltage to be above the peak input line voltage.

Typically, the controller for a power converter employing a boost topology measures an output characteristic (e.g., the output voltage or the output voltage plus a scaled value of the output current) representing an operating condition of the power converter, and based thereon modifies a duty cycle of a power switch or power switches (also referred to as "switch(es)") of the power converter to regulate the output characteristic. The duty cycle is a ratio represented by a conduction period of a switch to a switching period thereof. Thus, if a switch conducts for half of the switching period, the duty cycle for the switch would be 0.5 (or 50 percent). The controller should be configured to dynamically increase or decrease the duty cycle of the switches therein to regulate the output characteristic at a desired value. In an exemplary application, power converters have the capability to convert an unregulated ac input voltage such as 120 volts rms to a regulated dc output voltage (e.g., 400 volts dc) to power a load.

An important consideration for the design of a power converter is the efficiency (also referred to as "operating efficiency") of the power converter in a particular application, and under various operating conditions. The efficiency of a power converter is the ratio of its output power to the input power thereof. An exemplary efficiency of a power converter employing a boost topology while delivering a substantial portion of the rated output power to a load is typically 95 to 97 percent.

Operating efficiency is an important quality indicator for a power converter because of the broad impact efficiency has on equipment reliability and size, operating expense, and corresponding effects on the load equipment powered thereby. Thus, system considerations of achieving high operating efficiency have an immediate effect on the applicability of a particular power converter design, and the associated price the power converter can command in the marketplace.

Numerous prior art attempts have been made to optimize the operating efficiency of a power converter. Many attempts have focused on selection of proper components to provide the maximum operating efficiency for typical operating conditions. In general, a designer focuses on selecting switches with minimal conduction losses and low switching losses at the expected switching frequency. For example, a designer may select a switch formed of a compound semiconductor such as gallium arsenide or silicon carbide to provide low switching losses at higher switching frequencies, such as several hundred kilohertz or higher. Alternatively, a designer may select a switch formed of silicon to take advantage of the low conduction loss and low cost, which may be more relevant at lower switching frequencies, such as 100 kilohertz and lower.

One of the significant circuit elements contributing to power losses in a boost regulator is a boost inductor. Typically, a boost inductor is formed with multiple turns of a copper winding (also referred to as a "winding") wound around a magnetic core material such as a soft ferrite or powdered iron. Although a powdered iron core can provide low losses at high switching frequencies, it is generally limited by low permeability and its strong dependence on applied field. Soft ferrite cores, on the other hand, can provide higher permeability levels, but are limited in saturation flux density. In addition, inductors formed with multiple layers of copper windings around the magnetic core sustain substantial losses in the windings due to skin and proximity effects, particularly in windings formed of multiple layers. The presence of the boost inductor in boost regulators provides a significant contribution to power converter losses, which raises a challenge to the circuit designers to find a suitable design strategy for the boost inductor.

Examples of power converters employing a boost topology are described in a paper by L. Balogh, et al., entitled "Power Factor Correction With Interleaved Boost Converters in Continuous-Inductor-Current Mode," IEEE Proceedings of APEC, pp. 168-174, 1993, and in a paper by B. Miwa, et al., entitled "High Efficiency Power Factor Correction Using Interleaving Techniques," IEEE Proceedings of APEC, pp. 557-568, 1992, both of which are incorporated herein by reference. These papers describe the benefits of using interleaved boost regulators such as reduced volume of magnetic devices to achieve a given level of input ripple current, and to focus on analytical techniques and benefits of the circuit architecture. The aforementioned designs, however, do not employ integrated magnetic devices.

An example of an integrated magnetic device of the prior art for a power converter employing an interleaved boost regulator is given in a paper by Po-Wa Lee, et al. ("Lee"), entitled "Steady-State Analysis of an Interleaved Boost Converter with Coupled Inductors," IEEE Transactions on Industrial Electronics, Vol. 47, No. 4, pp. 787-795, August 2000, which is incorporated herein by reference. In this paper, Lee describes a power converter employing a boost regulator with coupled boost inductors, but does not include a common winding formed around a common leg of the magnetic core of the coupled boost inductor to provide further reduction in the level of input ripple current.

A further example of the prior art to provide high power converter efficiency is described by M. Rajeev in a paper entitled "An Input Current Shaper with Boost and Flyback Converter Using Integrated Magnetics," Power Electronics and Drive Systems, The Fifth International Conference on Power Electronics and Drive Systems 2003, Vol. 1, pp. 327-331, 17-20 Nov. 2003, which is incorporated herein by reference. Rajeev describes a power converter employing a single-switch boost regulator using integrated magnetic devices that incorporates three windings. One winding is an independent boost inductor, and the other two windings are the primary and secondary windings of an isolating power transformer (also referred to as a "power transformer" or a "transformer"). There is no substantial magnetic coupling between the boost inductor and the windings of the transformer. While Rajeev achieves some reduction in component volume by forming an integrated magnetic device, the circuit arrangement does not produce a higher ripple frequency for the input and output currents, and does not achieve significant reduction in conduction losses in the windings.

Another example of the prior art to provide high power converter efficiency using an integrated magnetic device is described by I. D. Jitaru, et al. ("Jitaru"), in a paper entitled "Quasi-Integrated Magnetic, An Avenue for Higher Power Density and Efficiency in Power Converters," Twelfth Annual Applied Power Electronics Conference and Exposition, Vol. 1, pp. 395-402, 23-27 Feb. 1997, which is incorporated herein by reference. Jitaru recognizes that power dissipation in a magnetic device, particularly a magnetic device formed with a soft ferrite, limits the high-frequency flux changes to a level substantially lower than the saturation flux density accessible at low frequencies. Thus, a circuit that can beneficially store energy in the magnetic core at a sufficiently low frequency can advantageously utilize core capability that is otherwise wasted. Jitaru applies this concept to an active clamp dc-to-dc power converter, using either a tapped transformer secondary winding or a current doubler output circuit configuration. While Jitaru is able to provide reduction in volume of magnetic devices, the technique is not applicable to a power converter constructed with a plurality of interleaved boost regulators.

Thus, attempts have been made in the prior art to reduce the volume of magnetic devices for power converters employing a boost topology, and to provide interleaving of boost regulators to increase the effective ripple frequency of high-frequency currents fed back to the input ac mains. Nonetheless, considering the limitations as described above, a coupled inductor for a power converter is presently not available for the more severe applications that lie ahead that depend on achieving high operating efficiency therefor. In accordance therewith, it would be beneficial to provide a coupled inductor formed with, for example, an integrated magnetic device for a power converter that adaptively increases power conversion efficiency, including the considerations of the aforementioned limitations.

SUMMARY OF THE INVENTION

These and other problems are generally solved or circumvented, and technical advantages are generally achieved, by advantageous embodiments of the present invention which includes a power converter including a power train with a coupled inductor and a plurality of regulators, and method of forming and operating the same. In one embodiment, the power train includes a coupled inductor including a magnetic core with a common leg, a first leg and a second leg. The coupled inductor also includes a common winding formed around the common leg, and first and second windings. The first winding is formed around the first leg, and is electrically and magnetically coupled to the common winding. The second winding is formed around the second leg, and is electrically and magnetically coupled to the common winding. The power train also includes a first regulator including a first main switch coupled to the first winding and a second regulator including a second main switch coupled to the second winding.

The foregoing has outlined rather broadly the features and technical advantages of the present invention in order that the detailed description of the invention that follows may be better understood. Additional features and advantages of the invention will be described hereinafter which form the subject of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a power converter including a coupled inductor and, more particularly, a power converter including a coupled inductor that is formed with at least three windings in an integrated magnetic device. The integrated magnetic device provides improved power conversion efficiency by accommodating a reduced volume of core material, reducing high-frequency switching ripple present in magnetic flux in legs (e.g., outer legs) of the magnetic core, and allowing the use of high performance magnetic materials with fewer turns of conductive windings that are formed thereabout.

Figure 1:
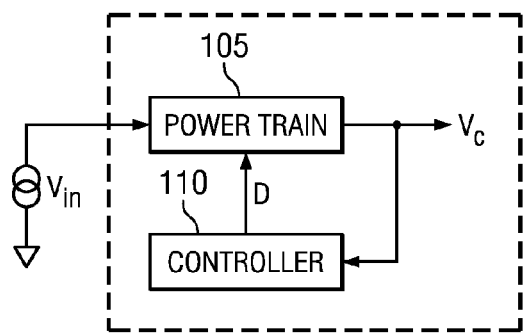
FIG. 1 illustrates a block diagram of an embodiment of a power converter constructed according to the principles of the present invention.

Referring initially to FIG. 1, illustrated is a block diagram of an embodiment of a power converter constructed according to the principles of the present invention. The power converter is coupled to a source of electrical power such as an ac mains for providing an ac input voltage $V_{in}$. The power converter includes a power train 105 that is controlled by a controller 110. The controller 110 generally measures an operating characteristic of the power converter such as an output voltage $V_c$ and controls a duty cycle D of a switch therein in response to the measured operating characteristic to regulate the characteristic. The power converter may form a section of a power supply and provide power to another subsystem thereof, such as an isolating dc-to-dc converter coupled to an output thereof that provides a regulated voltage to a load. The power train 105 may employ a regulator (e.g., a boost or buck regulator) as described herein. The power train 105 of the power converter generally includes a plurality of switches coupled to reactive circuit elements to provide the power conversion function.

Figure 2:
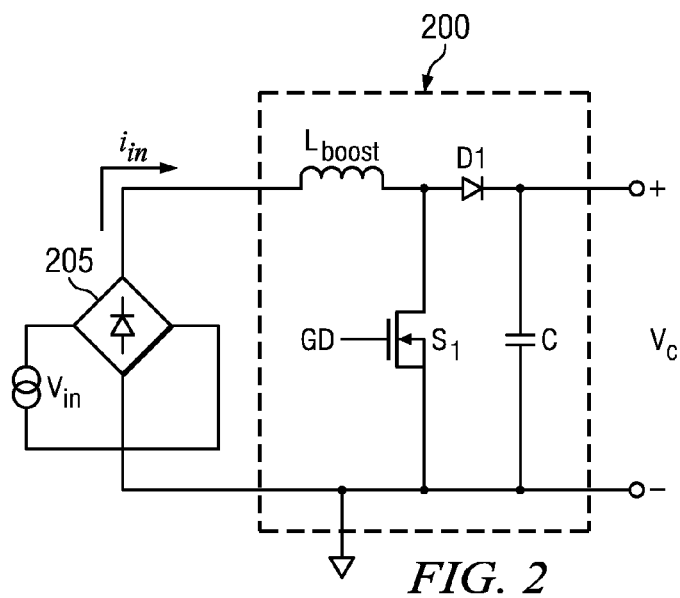
FIGS. 2 and 3 illustrate schematic diagrams of exemplary power trains of a power converter employing a boost regulator.
Figure 3:
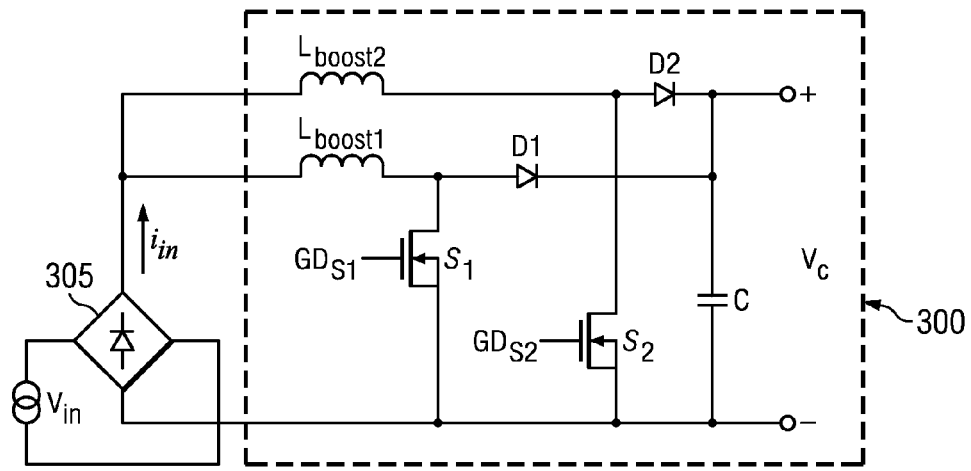

Turning now to FIGS. 2 and 3, illustrated are schematic diagrams of exemplary power trains of a power converter employing a boost regulator. Beginning with FIG. 2, illustrated is a power train 200 employing a boost regulator. The power converter receives an input voltage $V_{in}$ (e.g., an unregulated ac input voltage) from a source of electrical power such as an ac mains at an input thereof and provides a regulated output voltage $V_c$ at an output of the power converter. In keeping with the principles of a boost topology, the output voltage $V_c$ is generally higher than the input voltage $V_{in}$ such that a switching operation thereof can regulate the output voltage $V_c$. A main switch $S_1$ (e.g., an N-channel metal-oxide semiconductor "active" switch) of the boost regulator is enabled to conduct by a gate drive signal GD for a primary interval and couples the input voltage $V_{in}$ through a rectifier bridge 205 to a boost inductor $L_{boost}$. During a primary interval D, a rectified input current or input current $i_{in}$ flows through the boost inductor $L_{boost}$ to local circuit ground.

The duty cycle for the power train 200 depends in steady state, under continuous current in the boost inductor $L_{boost}$, on the ratio of the input and output voltages $V_{in}$, $V_c$, respectively, according to the equation:

$$D = 1 - \frac{V_{in}}{V_c}.$$

During a complementary interval 1-D, the main switch $S_1$ is transitioned to a non-conducting state and an auxiliary switch (e.g., a diode D1) conducts. In an alternative circuit arrangement, the auxiliary switch may include a second active switch that is controlled to conduct by a complementary gate drive signal. The diode D1 provides a path to maintain a continuity of the input current $i_{in}$ flowing through the boost inductor $L_{boost}$. During the complementary interval 1-D, the input current $i_{in}$ flowing through the boost inductor $L_{boost}$ decreases, and may become zero and remain zero for a period of time resulting in a "discontinuous conduction mode" of operation.

During the complementary interval 1-D, the current flowing through the boost inductor $L_{boost}$ flows through the diode D1 into an output filter capacitor C. In general, the duty cycle of the main switch $S_1$ (and the complementary duty cycle of the diode D1) may be adjusted to maintain a regulation of the output voltage $V_c$ of the power converter. The conduction periods for the main and auxiliary switches may be substantially equal or varied to maintain a regulation of the output voltage $V_c$ of the power converter. Those skilled in the art understand that conduction periods for the main and auxiliary switches may be separated by a small time interval by the use of "snubber" circuit elements (not shown) or by control circuit timing to avoid cross conduction current therebetween, and beneficially to reduce the switching losses associated with the power converter. Circuit and control techniques to avoid cross conduction currents between switches are well understood in the art and will not be described further in the interest of brevity.

Turning now to FIG. 3, illustrated is an exemplary power train 300 of a power converter employing first and second boost regulators coupled to first and second boost inductors $L_{boost1}$, $L_{boost2}$, respectively. The first boost regulator includes a first main switch S1 and a first auxiliary switch (e.g., a first diode D1). The second boost regulator includes a second main switch S2 and a second auxiliary switch (e.g., a second diode D2). The first and second main switches S1, S2 receive first and second gate drive signals $GD_{S1}$, $GD_{S2}$, respectively, generally controlled to operate roughly 180 degrees out of phase with respect to each other. Out-of-phase operation of the boost regulators provides an interleaving effect that doubles the ripple frequency and reduces the ripple magnitude for an ac input current delivered to a rectifier bridge 305. The rectifier bridge 305 provides a rectified input current or input current $i_{in}$. A similar effect is achieved for the current supplied to an output filter capacitor C. The reduction of switching ripple in the ac input current helps reduce filtering requirements for an input filter (not shown) to reduce undesirable high-frequency components. Although substantial benefits can accrue from the interleaving effects between two boost regulators, the design challenges previously described to implement efficient boost inductors still remain. Remaining circuit elements in FIG. 3 and in following FIGUREs that are similar to those in FIG. 2 and other FIGUREs will not generally be described again in the interest of brevity.

Figure 4:
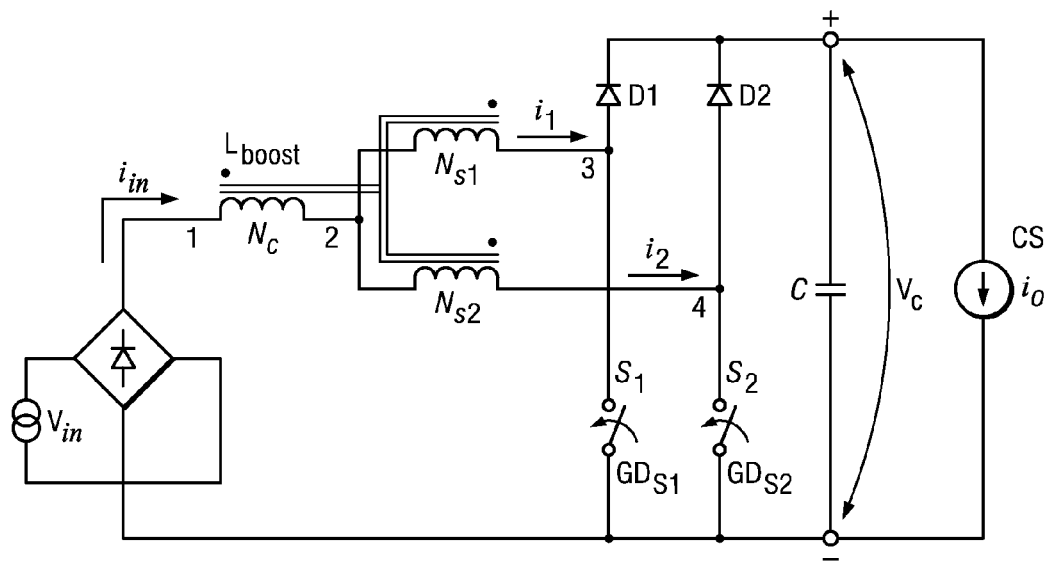
FIGS. 4 and 5 illustrate schematic diagrams of embodiments of portions of power converters constructed according to the principles of the present invention.
Figure 5:
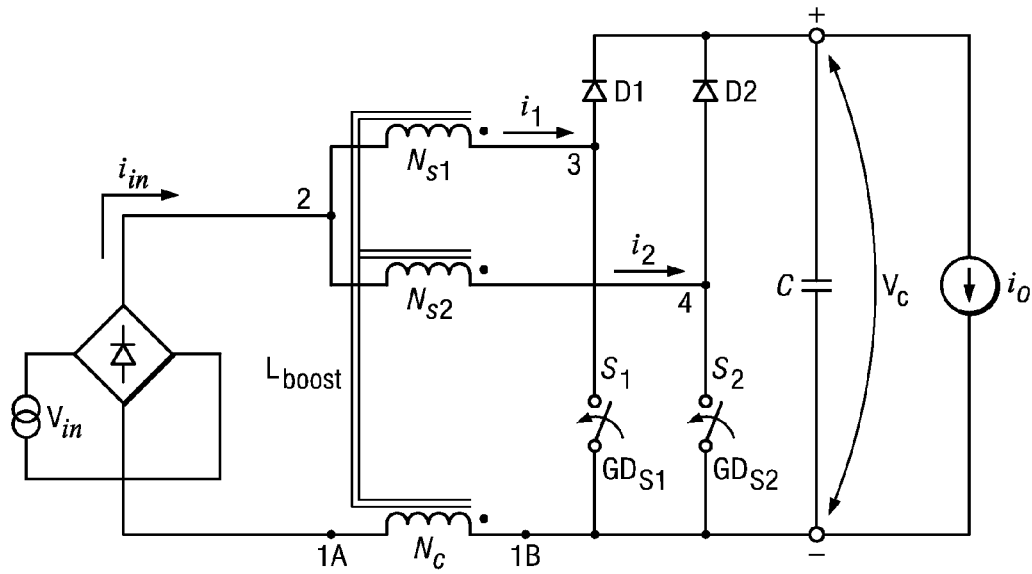

Turning now to FIGS. 4 and 5, illustrated are schematic diagrams of embodiments of portions of power converters constructed according to the principles of the present invention. More specifically, FIG. 4 illustrates a power train employing a boost topology with two interleaved boost regulators (e.g., first and second boost regulators) and a coupled boost inductor $L_{boost}$ formed by an integrated magnetic device. It should be understood, however, that other topologies such as a buck topology with interleaved regulators (e.g., first and second regulators) and a coupled inductor as described herein are well within the broad scope of the present invention. The coupled boost inductor $L_{boost}$ includes a common winding $N_c$ (coupled between nodes 1 and 2), a first winding $N_{S1}$ (coupled between nodes 2 and 3), and a second winding $N_{S2}$ (coupled between nodes 2 and 4). The first and second windings $N_{S1}$, $N_{S2}$ are electrically and magnetically coupled to the common winding $N_c$. In an advantageous embodiment, the first and second windings $N_{S1}$, $N_{S2}$ have equal numbers of turns and will hereinafter be represented with a reference symbol $N_S$. Dots are illustrated in the FIGURE adjacent to the windings to indicate the sense of each winding (i.e., the winding direction and the sense of the magnetically induced voltage therein).

In an advantageous embodiment, the interleaved boost regulators are controlled to provide an input current with high-power factor. The first boost regulator includes a first main switch (e.g., a field-effect transistor) $S_1$ and a first auxiliary switch (e.g., a first diode D1), and is coupled to a portion of the coupled boost inductor $L_{boost}$ including the common winding $N_c$ and the first winding $N_{S1}$. The second boost regulator includes a second main switch (e.g., a field-effect transistor) $S_2$ and a second auxiliary switch (e.g., a second diode D2), and is coupled to a portion of the coupled boost inductor $L_{boost}$ including the common winding $N_c$ and the second winding $N_{S2}$. The output currents from the boost regulators of the power train are interleaved and flow through the first and second diodes D1, D2 into an output filter capacitor C. Similarly, the rectified input current or input current $i_{in}$ to the boost regulators are interleaved and flow through the common winding $N_c$. The first and second main switches $S_1$, $S_2$ are controlled by control signals $GD_{S1}$, $GD_{S2}$, respectively, to provide duty-cycle control for each of the two interleaved boost regulators. Typically, the control signals $GD_{S1}$, $GD_{S2}$ are controlled 180 degrees out of phase with respect to each other, and provide a common duty cycle D for each boost regulator. A load, represented by current source CS, is coupled to output terminals of the power converter and draws a current $i_o$.

A common winding $N_c$ with selected turns has been described herein as being formed around a common leg (e.g., a center leg of an E-core) of a magnetic core (e.g., an E magnetic core) of the integrated magnetic device. In an alternative embodiment, the common winding $N_c$ with selected turns may be formed around a common leg of a magnetic core that is not geometrically a center leg. Thus, the terms common leg may include a leg of a magnetic core that may not be geometrically located as a center leg.

With respect to FIG. 5, illustrated is a circuit schematic of an alternative embodiment of a power converter with a power train having two interleaved boost regulators utilizing a couple boost inductor $L_{boost}$ formed by an integrated magnetic device. Again, other topologies such as a buck-boost topology with interleaved regulators (e.g., first and second regulators) and a coupled inductor as described herein are well within the broad scope of the present invention. The couple boost inductor $L_{boost}$ includes a common winding $N_c$ between nodes 1A and 1B, coupled to node 2 thereof in a return leg of the boost regulator that is coupled to the source of electrical power for providing an input voltage $V_{in}$. A first winding $N_{S1}$ of the couple boost inductor $L_{boost}$ is coupled between nodes 2 and 3, and a second winding $N_{S2}$ is coupled between node 2 and node 4. The first and second windings $N_{S1}$, $N_{S2}$ are magnetically coupled to the common winding $N_c$ and are electrically coupled to the common winding $N_c$. The operation of the power converter illustrated in FIGS. 4 and 5 is substantially similar. Remaining elements in FIG. 5 with reference designations corresponding to those in FIG. 4 are substantially the same and will not be redescribed in the interest of brevity.

In a further alternative embodiment of the couple boost inductor $L_{boost}$, the first and second windings $N_{S1}$, $N_{S2}$ can be electrically coupled together external to an integrated magnetic device forming a portion of the couple boost inductor $L_{boost}$. In a further alternative embodiment of the couple boost inductor $L_{boost}$, the common winding $N_c$ can be separated into two winding parts, each part coupled in the power converter as indicated in FIGS. 4 and 5 for the respective winding.

Figure 6:
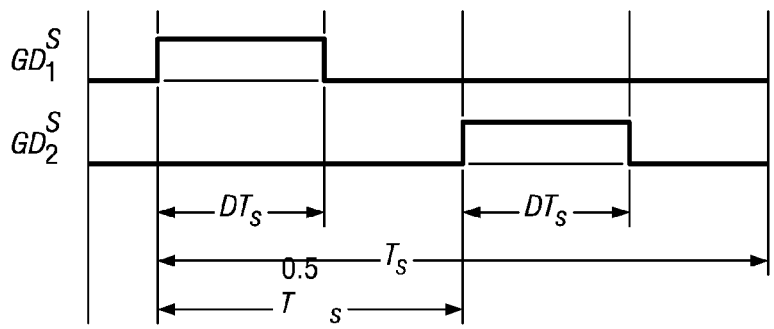
FIG. 6 illustrates a timing diagram demonstrating an operation of the power converter of FIGS. 4 and 5.

Turning now to FIG. 6, illustrated is a timing diagram demonstrating an operation of the power converter of FIGS. 4 and 5. The period of a switching cycle is represented by the variable $T_S$. The periods when the first and second main switches $S_1$, $S_2$ are enabled to conduct are represented by the quantity $D \cdot T_s$, which is assumed to be the same interval of time therefor. The first and second main switches $S_1$, $S_2$ are operated 180 degrees out of phase by a delay $0.5 \cdot T_S$ as shown in FIG. 6.

Figure 7:
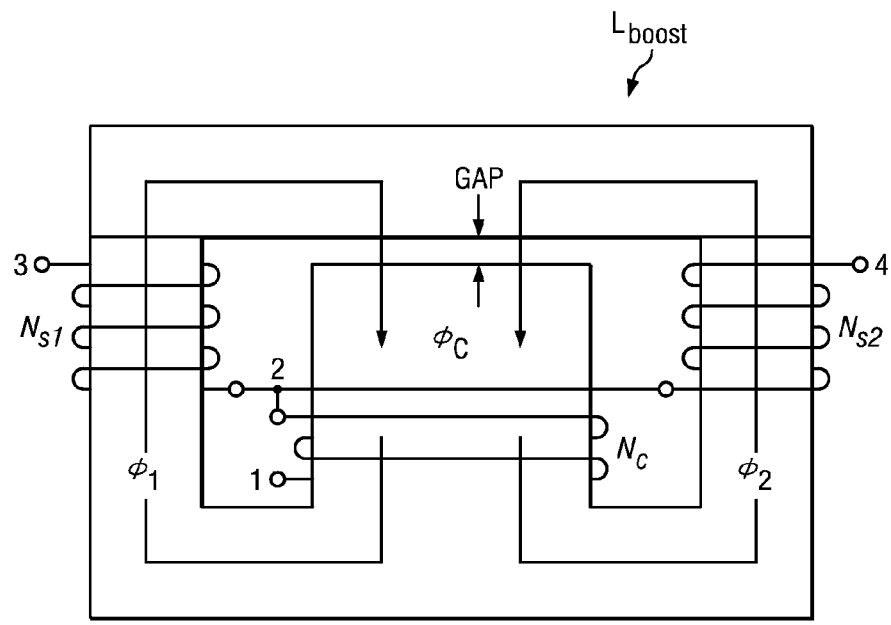
FIG. 7 illustrates a diagram of an embodiment of a coupled inductor formed by an integrated magnetic device constructed according to the principles of the present invention.

Turning now to FIG. 7, illustrated is a diagram of an embodiment of a coupled inductor (e.g., a coupled boost inductor $L_{boost}$) formed by an integrated magnetic device constructed according to the principles of the present invention. The integrated magnetic device includes a common winding $N_c$ wound around a common leg of the magnetic core, which may be a center leg of an E-core, and is electrically and magnetically coupled to first and second windings $N_{S1}$, $N_{S2}$ wound around first and second legs (e.g., first and second outer legs) of the magnetic core. A flux $\phi_c$ flows through the common leg of the magnetic core. Fluxes $\phi_1$, $\phi_2$ flow through the first and second legs, respectively, of the magnetic core. Ignoring fringing flux fields, the flux $\phi_c$ in the common leg can be represented as the sum of the fluxes in the first and second legs as set forth below.

$$\phi_c = \phi_1 + \phi_2$$

Nodes 1, 2, 3, and 4 of the integrated magnetic device illustrated in FIG. 7 correspond to nodes similarly numbered and described with reference to FIG. 4. In the embodiment of the integrated magnetic device illustrated in FIG. 7, a gap (e.g., an air gap or a gap of another substantially nonmagnetic material) is formed between the upper surface of the common leg and the lower surface of the upper cross-member of the magnetic core. In an alternative embodiment, gaps, preferably of equal length, can be formed between the upper surfaces of the first and second legs and/or the lower surface of the cross-member. In further embodiments, gaps, not all necessarily of equal length, can be formed between upper surfaces of all the legs and the lower surface of the cross-member. The sense of the winding directions is illustrated by the drawings of the windings in FIG. 7. Of course, the sense of all the windings can be reversed to produce the same result, but with magnetic fluxes flowing in opposite directions. The integrated magnetic device illustrated herein thus integrates and couples three inductors into one magnetic device.

Figure 8:
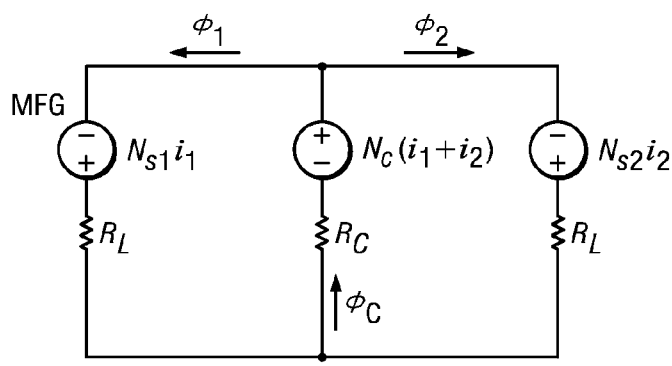
FIG. 8 illustrates an equivalent magnetomotive force circuit diagram of the coupled inductor formed by the integrated magnetic device of FIG. 7.

Turning now to FIG. 8 illustrates an equivalent magnetomotive force circuit diagram of the coupled inductor (e.g., the coupled boost inductor $L_{boost}$) formed by the integrated magnetic device of FIG. 7. Magnetomotive force is generally represented as an ampere-turns product (N·I), and has units of "ampere-turns," (or "gilberts," a related quantity in the cgs system of units). In a linear magnetics system with a reluctance R, the resulting flux is represented by the equation:

$$N \cdot i = R \cdot \phi,$$

wherein N represents the number of serially wound turns in a winding, i represents current flowing through the winding, R represents the magnetic reluctance of the flux path, and $\phi$ represents the resulting flux that flows in the path. FIG. 8 illustrates three magnetomotive force generators, such as magnetomotive force generator (one of which is designated "MFG"), each generator representing the magnetomotive force generated by one of the three respective windings in the integrated magnetic device. Three path reluctances are also illustrated such as path reluctance (designated "$R_L$" or "$R_C$"). The reluctances of the outer legs are assumed (without limitation) to be equal, and are represented by the quantity $R_L$. The reluctance of the common leg is represented by the quantity $R_C$. The reluctance model illustrated herein recognizes that the current flowing through the common winding around the common leg is equal to the sum of the currents in the first and second windings around the first and second legs. A quantity $N_S$ will be used to represent the number of turns for the first and second windings $N_{S1}$, $N_{S2}$ on the first and second legs, respectively, of the magnetic core, which number of turns are assumed, without limitation, to be equal. Additionally, a quantity $N_c$ will be used to represent the number of turns for the common winding $N_c$ of the magnetic core.

The equations that describe the time-varying evolution of the fluxes $\phi_1$, $\phi_2$ in the first and second legs of the magnetic core and the flux $\phi_C$ in the common leg of the magnetic core are:

$$N_s \frac{d\phi_1}{dt} + N_c \frac{d\phi_c}{dt} = v_1$$

$$N_s \frac{d\phi_2}{dt} + N_c \frac{d\phi_c}{dt} = v_2$$

$$\phi_C = \phi_1 + \phi_2$$

$$\begin{bmatrix} N_s + N_c & N_c \\ N_c & N_s + N_c \end{bmatrix} \frac{d}{dt} \begin{bmatrix} \phi_1 \\ \phi_2 \end{bmatrix} = \begin{bmatrix} v_1 \\ v_2 \end{bmatrix}$$

where, $$v_1 = v_{in} - (1 - s_1)v_c$$

and $$v_2 = v_{in} - (1 - s_2)v_c.$$

In the equations above, the variables $s_1$, $s_2$ represent the state of the first and second main switches $S_1$, $S_2$, respectively, and assume the value 0 when the respective main switch is off, and the value +1 when the main switch is on. The variables $v_1$, $v_2$ represent a voltage corresponding to the respective variable $s_1$ or $s_2$ in the equations above. The currents $i_1$, $i_2$ in the first and second legs of the magnetic core can be represented in terms of the fluxes $\phi_1$, $\phi_2$ therein by a matrix equation:

$$\begin{bmatrix} N_s + N_c & N_c \\ N_c & N_s + N_c \end{bmatrix} \begin{bmatrix} i_1 \\ i_2 \end{bmatrix} = \begin{bmatrix} R_L + R_C & R_C \\ R_C & R_L + R_C \end{bmatrix} \begin{bmatrix} \phi_1 \\ \phi_2 \end{bmatrix}.$$

The matrix on the left side of the equation above can be inverted to give the currents $i_1$, $i_2$ in the first and second legs:

$$\begin{bmatrix} i_1 \\ i_2 \end{bmatrix} = \frac{1}{N_s(N_s + 2N_c)} \begin{bmatrix} N_s + N_c & -N_c \\ -N_c & N_s + N_c \end{bmatrix} \begin{bmatrix} R_L + R_C & R_C \\ R_C & R_L + R_C \end{bmatrix} \begin{bmatrix} \phi_1 \\ \phi_2 \end{bmatrix},$$

thereby representing the currents $i_1$, $i_2$ in the first and second windings around the first and second legs in terms of the fluxes $\phi_1$, $\phi_2$ in the first and second legs, respectively. Expanding the equation above provides the currents $i_1$, $i_2$ and their sum, $i_1 + i_2 = i_{in}$, which is related to the flux $\phi_C$ in the common leg of the magnetic core as set forth below.

$$i_1 = \frac{1}{N_s(N_s + 2N_c)} N_s R_L \phi_1 + N_c R_L(\phi_1 - \phi_2) + N_s R_C \phi_C$$

$$i_2 = \frac{1}{N_s(N_s + 2N_c)} N_s R_L \phi_2 + N_c R_L(\phi_2 - \phi_1) + N_s R_C \phi_C$$

$$i_1 + i_2 = \frac{(R_L + 2R_C)}{(N_s + 2N_c)} (\phi_1 + \phi_2)$$

$$= i_{in}$$

$$= \frac{(R_L + 2R_C)}{(N_s + 2N_c)} \phi_C.$$

The resulting input current is given by the equation:

$$i_{in} = \frac{(R_L + 2R_C)}{(N_s + 2N_c)} \phi_C.$$

Making the assumption that the magnetic reluctance of the first and second legs of the magnetic core is substantially less then the magnetic reluctance of the common leg (i.e., assuming, without limitation, that only the common leg is gapped and correspondingly that reluctances $R_L \ll R_C$) provides an estimate for the net input current $i_{in}$ to the coupled boost inductor formed by the integrated magnetic device as set forth below:

$$\langle i_{in} \rangle \approx \frac{2R_C}{N_s + 2N_c} \langle B_C \rangle A_C =$$

$$\frac{1}{N_s + 2N_c} \frac{2}{\mu_o} \frac{l_G}{A_C} \langle B_C \rangle A_C = \frac{1}{N_s + 2N_c} \frac{2l_G}{\mu_o} \frac{2l_G}{\mu_o} \langle B_C \rangle.$$

In the equation above, $B_C$, $A_C$, and $l_G$ are, respectively, the flux density in the common leg of the magnetic core, the cross sectional area of the common leg of the magnetic core, and the length of the gap in the common leg. The quantity $\mu_o$ represents the magnetic permeability of free space, and the operator $\langle \rangle$ indicates a time average taken over a switching cycle. The quantity $I_{in,pk}$ in the equation below is the peak value of the input current to the coupled boost inductor formed by the integrated magnetic device. The equations below provide a representation of the average input current and the peak-to-peak high-frequency sawtooth input current as set forth below.

$$I_{in,pk} = \langle I_{in} \rangle + \frac{\Delta i_{in}}{2},$$

$$\langle I_{in} \rangle = \frac{(R_L + 2R_C)}{(N_s + 2N_c)} \phi_C \approx \frac{1}{N_s + 2N_c} \frac{2l_G}{\mu_o} \langle B_C \rangle$$

$$\Delta i_{in} = \frac{(R_L + 2R_C)}{(N_s + 2N_c)} \Delta \phi_C \approx \frac{1}{(N_s + 2N_c)} \frac{2l_G}{\mu_o} \Delta B_C$$

$$\Delta B_C = \begin{cases} 2\frac{\Delta \phi_{FW}}{A_C} & D < 0.5 \\ 2\frac{\Delta \phi_{PT3}}{A_C} & D > 0.5 \end{cases}.$$

The input current drawn by a power train employing a boost topology of a power converter is thus generally of the wave shape of a rectified sinusoidal current, and superimposed on the rectified sinusoidal waveform is a high-frequency sawtooth waveform resulting from the switching action of the power train. The high-frequency current should be substantially filtered by a low-pass network coupled between the ac mains and the power train to meet regulatory requirements to avoid electromagnetic interference with other electronic products, particularly communication products. A measure of performance of the power converter, in general, is the maximum high-frequency peak-to-peak current drawn before attenuation by a filtering network, which substantially affects the design of the low-pass filter.

Figure 9A:
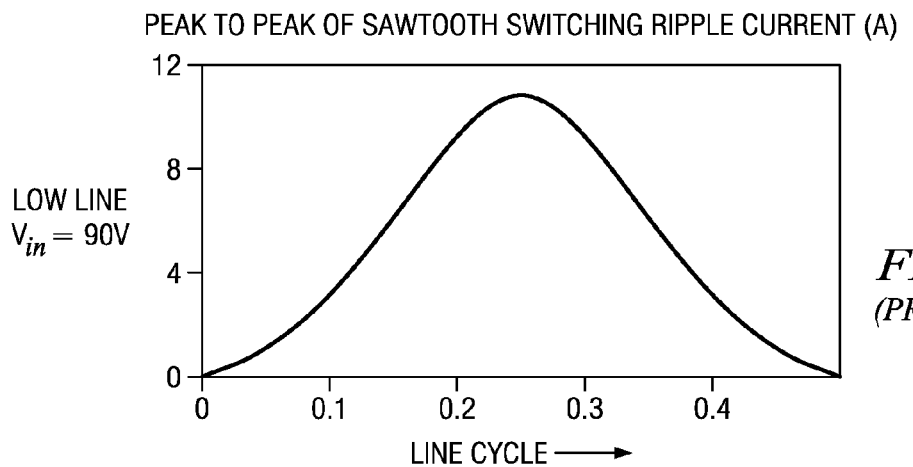
FIGS. 9A and 9B illustrate diagrams of magnitudes of exemplary high-frequency unfiltered peak-to-peak sawtooth currents drawn over a half cycle of the input line for an off-line power converter.
Figure 9B:
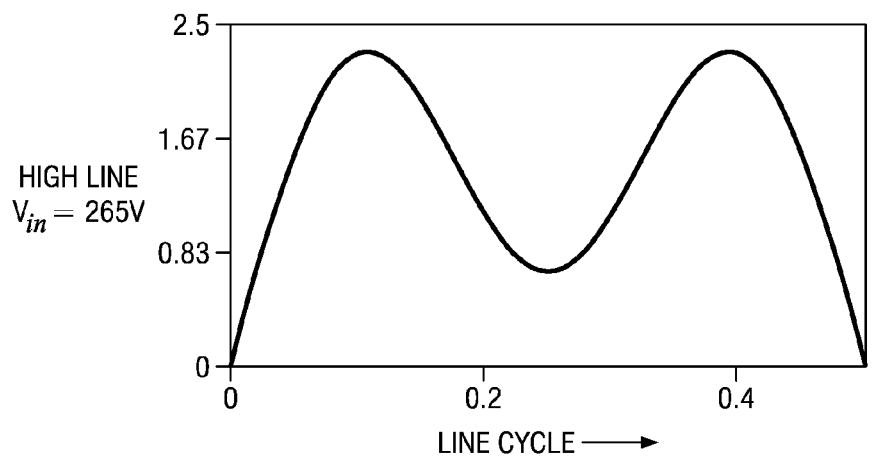

Turning now to FIGS. 9A and 9B, illustrated are diagrams of magnitudes of exemplary high-frequency unfiltered peak-to-peak sawtooth currents drawn over a half cycle of an input power for a power converter. The data represents a power converter employing a single boost regulator similar to the design illustrated in FIG. 2, with a boost inductor of 59 turns wound on a powdered iron toroidal core. The switching frequency is 100 kilohertz ("kHz"), and the circuit delivers one kilowatt ("kW") average power to a load. The high-frequency sawtooth peak-to-peak ripple is plotted in FIG. 9A at low line voltage (i.e., at an rms input voltage of 90 volts) and in FIG. 9B at high line voltage is plotted (i.e., an rms input voltage of 265 volts). The graph illustrating peak-to-peak ripple performance at the low line voltage accounts for the expected loss of inductance of the boost inductor at high input currents due to loss of permeability of the magnetic material at high magnetic field. The high-frequency sawtooth peak-to-peak input ripple current $\Delta i_{p-p}$ can be represented by the equation:

$$\Delta i_{p-p} = \frac{V_{in} \cdot D}{L \cdot f_s},$$

wherein $V_{in}$ is the instantaneous rectified input voltage, D is the instantaneous duty cycle controlled by the controller, L is the inductance of the boost inductor, which is generally dependent on the instantaneous current level (due to the dependence of material permeability on the current), and $f_s$ is the switching frequency.

The equation above indicates that the loss of inductance at high line currents results in a corresponding increase in peak-to-peak ripple current. The peak-to-peak input ripple current is substantially zero at the beginning and half-cycle points of a line cycle due to substantially zero input voltage and current at these points. The minimum in the peak-to-peak input ripple current for the high line voltage at the one quarter point in the ac line cycle is due to the small duty cycle that occurs at the peak of the ac input line voltage without a substantial loss of boost inductance, and the correspondingly smaller line currents at higher line voltages at constant average output power.

Figure 10A:
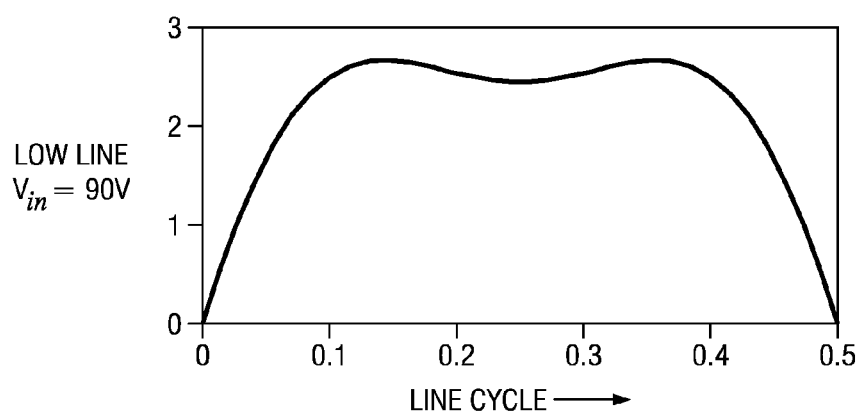
FIGS. 10A and 10B illustrate diagrams of magnitudes of exemplary high-frequency unfiltered peak-to-peak sawtooth currents drawn over a half cycle of an input power for a power converter constructed according to the principles of the present invention.
Figure 10B:
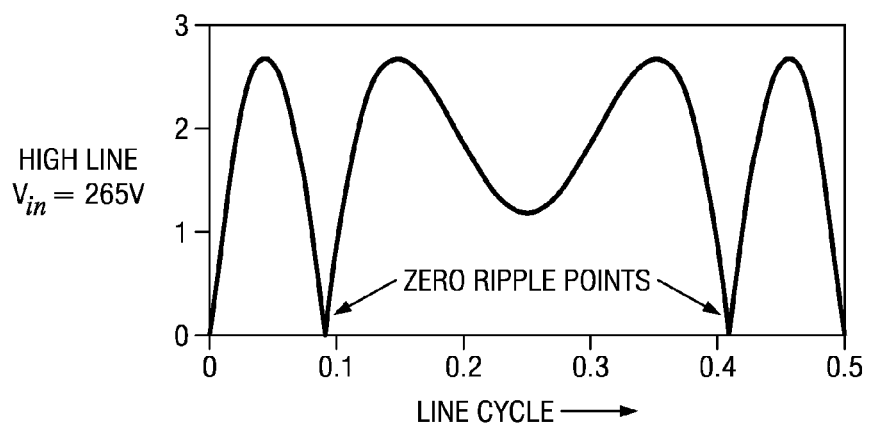

Turning now to FIGS. 10A and 10B, illustrated are diagrams of magnitudes of exemplary high-frequency unfiltered peak-to-peak sawtooth currents drawn over a half cycle of an input power for a power converter constructed according to the principles of the present invention. The power converter includes a power train with two interleaved regulators (e.g., two interleaved regulators) and a coupled inductor (e.g., a coupled boost inductor) formed by an integrated magnetic device. Similar to the operating conditions illustrated in FIGS. 9A and 9B, the power converter provides one kW average output power to a load, with a switching frequency for each of the two boost regulators of 100 kHz. The integrated magnetic device is formed with windings around first and second legs of the magnetic core as previously described, each winding formed with 40 turns, and a common winding of five turns formed around the common leg. The dimensions of the magnetic core are about 42 millimeters ("mm")×20 mm×27 mm. Calculation of inductance over the range of input voltage from 90 volts rms to 265 volts rms at one kW indicates insignificant loss of inductance for the integrated magnetic device.

The diagrams indicate significantly reduced ripple current, both at high line voltage and at low line voltage, compared to the design represented in FIGS. 9A and 9B. This reduction in ripple current is due to interleaving of currents in the two-phase design, the effective ripple frequency being twice the switching frequency of either boost regulator, and the relative stability of magnetic permeability of the ferrite material compared to powdered iron at high magnetic field. In addition, two points along a half wave of the input mains ac cycle produce zero ripple current. These zero-ripple points occur at a duty cycle of D=0.5, which occurs when the input voltage is one half the output voltage, which in turn occurs when the input rms voltage is greater than about 141 volts (i.e., 400/(2√2)) for a 400-volt dc output. Significantly lower magnetic core and copper losses were also calculated for the integrated magnetic device as a consequence of the reduced high-frequency ripple current in windings.

The power converter including a power train having interleaved boost regulators illustrated in FIGS. 4 and 5, constructed with the coupled boost inductor formed by the integrated magnetic device illustrated in FIG. 7, operates (in a "continuous conduction mode") in four power transfer stages. In a first power transfer stage (identified as "PT1"), the first main switch $S_1$ is on (i.e., conducts) and the second main switch $S_2$ is off (i.e., non-conducting). In a second power transfer stage (identified as "PT2"), the second main switch $S_2$ is on and the first main switch $S_1$ is off. In a third power transfer stage (identified as "PT3"), both switches are on. In a fourth power transfer stage or a freewheeling power stage (identified as "FW"), both switches are off. The freewheeling power stage FW is absent when duty cycle D is greater than 0.5. The third power transfer stage PT3 only occurs when duty cycle D is greater than 0.5. As discussed below, FIGS. 11 to 14 demonstrate the power trains with respect to four power transfer stages. The instantaneous input voltage to the power converter including the power train with interleaved boost regulators is illustrated in FIGS. 11 through 14 by a battery with voltage $V_{in}$. The currents through the first and second windings $N_{S1}$, $N_{S2}$ of the coupled boost inductor are identified in these FIGUREs as the currents $i_1$ and $i_2$, respectively.

When the duty cycle D of switches is less than 0.5, the sequence of power transfer stages is the first power transfer stage PT1, then the freewheeling power stage FW, then the second power transfer stage PT2, then the freewheeling power stage FW, then the first power transfer stage PT1, etc. When the duty cycle D of switches is greater than 0.5, the sequence of power transfer stages is the third power transfer stage PT3, then the first power transfer stage PT1, then the third power transfer stage PT3, then the second power transfer stage PT2, then the third power transfer stage PT3, etc.

Figure 11:
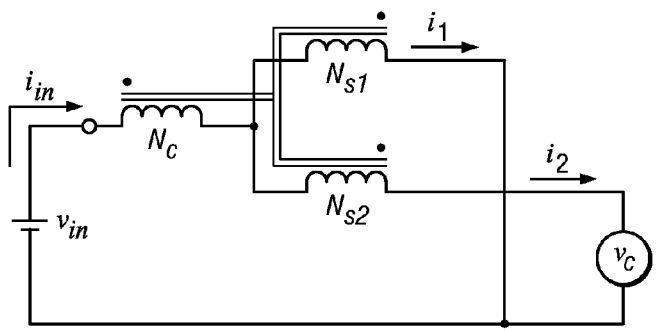
FIGS. 11 to 14 illustrate schematic diagrams of embodiments of power trains during selected power transfer stages of operation according to the principles of the present invention.

Turning now to FIGS. 11 to 14, illustrated are schematic diagrams of embodiments of power trains during selected power transfer stages of operation according to the principles of the present invention. Beginning with FIG. 11, illustrated is a simplified schematic drawing of a first power transfer stage PT1, when the first main switch $S_1$ is on and the second main switch $S_2$ is off (and the second diode D2 is conducting). Equations that describe the time varying behavior of the fluxes $\phi_1$ and $\phi_2$ in the first and second legs, respectively, of the magnetic core in terms of the input voltage $V_{in}$ and the output voltage $V_c$, and the number of turns in the windings (where the number of turns in the first and second windings $N_{S1}$, $N_{S2}$ is represented below by the quantity $N_S$ and the number of turns in the common winding $N_c$ is represented by $N_c$) are given below:

$$\begin{bmatrix} N_s + N_c & N_c \\ N_c & N_s + N_c \end{bmatrix} \frac{d}{dt}\begin{bmatrix} \phi_1 \\ \phi_2 \end{bmatrix} = \begin{bmatrix} v_{in} \\ v_{in} - v_c \end{bmatrix}$$

$$\frac{d}{dt}\begin{bmatrix} \phi_1 \\ \phi_2 \end{bmatrix} = \frac{1}{N_s(N_s + 2N_c)} \begin{bmatrix} N_s + N_c & -N_c \\ -N_c & N_s + N_c \end{bmatrix} \begin{bmatrix} v_{in} - v_c \\ v_{in} \end{bmatrix}$$

$$= \frac{1}{N_s(N_s + 2N_c)} \begin{bmatrix} (N_s + N_c)(v_{in} - v_c) - N_c v_{in} \\ (N_s + N_c)v_{in} - N_c(v_{in} - v_c) \end{bmatrix}$$

$$= \frac{1}{N_s(N_s + 2N_c)} \begin{bmatrix} N_s v_{in} - (N_s + N_c)v_c \\ N_s v_{in} + N_c v_c \end{bmatrix}.$$

Figure 12:
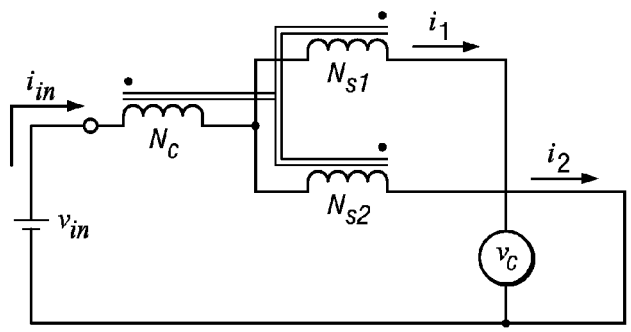

Similarly, for FIG. 12 demonstrating a second power transfer stage PT2 wherein the second main switch $S_2$ is on and the first main switch $S_1$ is off (and the first diode D1 is conducting), the corresponding equations are as set forth below:

$$\begin{bmatrix} N_s + N_c & & N_c \\ & N_c & \\ N_c & & N_s + N_c \end{bmatrix} \frac{d}{dt}\begin{bmatrix} \phi_1 \\ \phi_2 \end{bmatrix} = \begin{bmatrix} v_{in} \\ v_{in} - v_c \end{bmatrix}$$

$$\frac{d}{dt}\begin{bmatrix} \phi_1 \\ \phi_2 \end{bmatrix} = \frac{1}{N_s(N_s + 2N_c)} \begin{bmatrix} N_s + N_c & -N_c \\ -N_c & N_s + N_c \end{bmatrix} \begin{bmatrix} v_{in} - v_c \\ v_{in} \end{bmatrix}$$

$$= \frac{1}{N_s(N_s + 2N_c)} \begin{bmatrix} (N_s + N_c)(v_{in} - v_c) - N_c v_{in} \\ (N_s + N_c)v_{in} - N_c(v_{in} - v_c) \end{bmatrix}$$

$$= \frac{1}{N_s(N_s + 2N_c)} \begin{bmatrix} N_s v_{in} - (N_s + N_c)v_c \\ N_s v_{in} + N_c v_c \end{bmatrix}.$$

Figure 13:
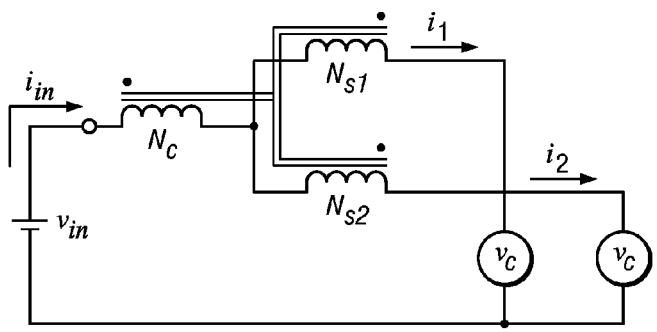

For FIG. 13, the corresponding equations for a freewheeling power stage FW (the first and second main switches $S_1$, $S_2$ are off, and the first and second diodes D1, D2 are conducting) are as set forth below:

$$\begin{bmatrix} N_s + N_c & & N_c \\ & N_c & \\ N_c & & N_s + N_c \end{bmatrix} \frac{d}{dt}\begin{bmatrix} \phi_1 \\ \phi_2 \end{bmatrix} = \begin{bmatrix} v_{in} - v_c \\ v_{in} - v_c \end{bmatrix}$$

$$\frac{d}{dt}\begin{bmatrix} \phi_1 \\ \phi_2 \end{bmatrix} = \frac{1}{N_s(N_s + 2N_c)} \begin{bmatrix} N_s + N_c & -N_c \\ -N_c & N_s + N_c \end{bmatrix} \begin{bmatrix} v_{in} - v_c \\ v_{in} - v_c \end{bmatrix}$$

$$= \frac{1}{N_s(N_s + 2N_c)} \begin{bmatrix} N_s(v_{in} - v_c) \\ N_s(v_{in} - v_c) \end{bmatrix}$$

$$= \frac{1}{(N_s + 2N_c)} \begin{bmatrix} v_{in} - v_c \\ v_{in} - v_c \end{bmatrix}.$$

Figure 14:
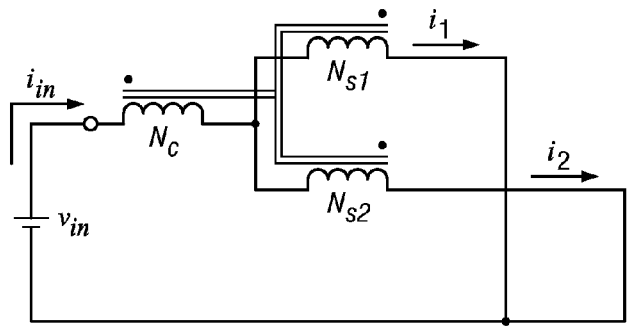

For FIG. 14, the corresponding equations for a third power transfer stage PT3 (both the first and second main switches $S_1$, $S_2$ are on) are as set forth below:

$$\begin{bmatrix} N_s + N_c & & N_c \\ & N_c & \\ N_c & & N_s + N_c \end{bmatrix} \frac{d}{dt}\begin{bmatrix} \phi_1 \\ \phi_2 \end{bmatrix} = \begin{bmatrix} v_{in} \\ v_{in} \end{bmatrix}$$

$$\frac{d}{dt}\begin{bmatrix} \phi_1 \\ \phi_2 \end{bmatrix} = \frac{1}{N_s(N_s + 2N_c)} \begin{bmatrix} N_s + N_c & -N_c \\ -N_c & N_s + N_c \end{bmatrix} \begin{bmatrix} v_{in} \\ v_{in} \end{bmatrix}$$

$$= \frac{1}{N_s(N_s + 2N_c)} \begin{bmatrix} N_s v_{in} \\ N_s v_{in} \end{bmatrix}$$

$$= \frac{1}{(N_s + 2N_c)} \begin{bmatrix} v_{in} \\ v_{in} \end{bmatrix}.$$

Thus, the time varying behavior of the fluxes $\phi_1$ and $\phi_2$ in various power transfer stages can be related to the input voltage $V_{in}$ and the output voltage $V_c$.

Figure 15:
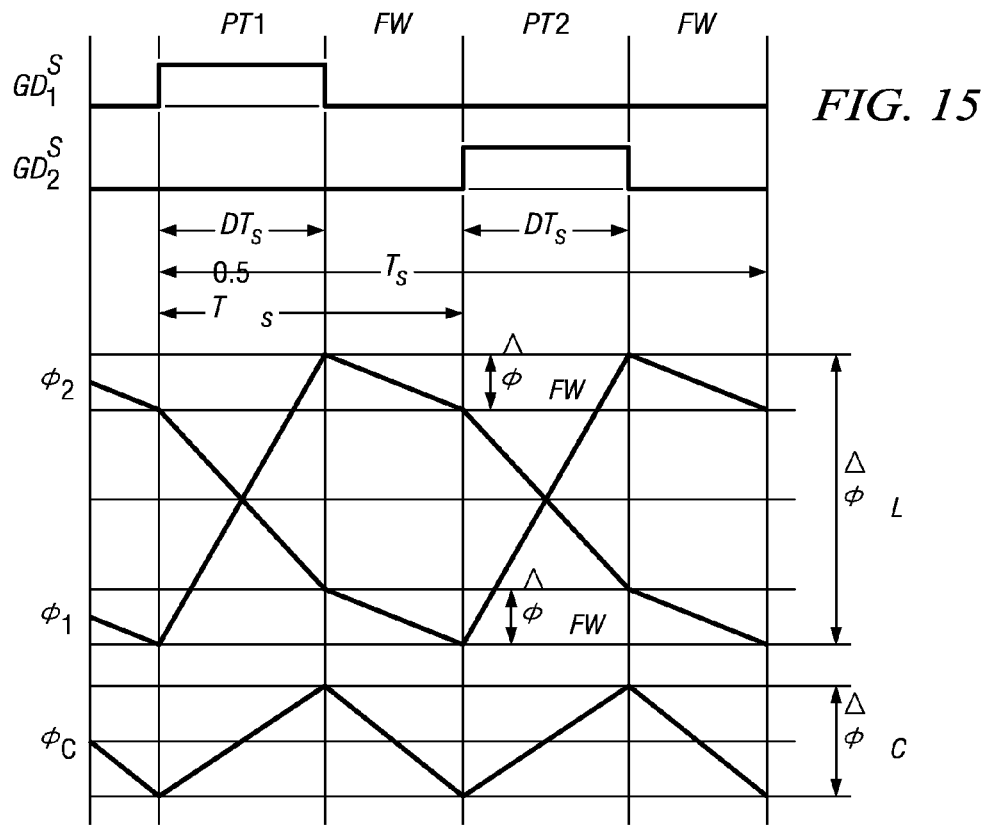
FIGS. 15 and 16 illustrate diagrams of exemplary high-frequency flux components in a common leg of a magnetic core and high-frequency flux components in each of first and second legs of the magnetic core according to the principles of the present invention.
Figure 16:
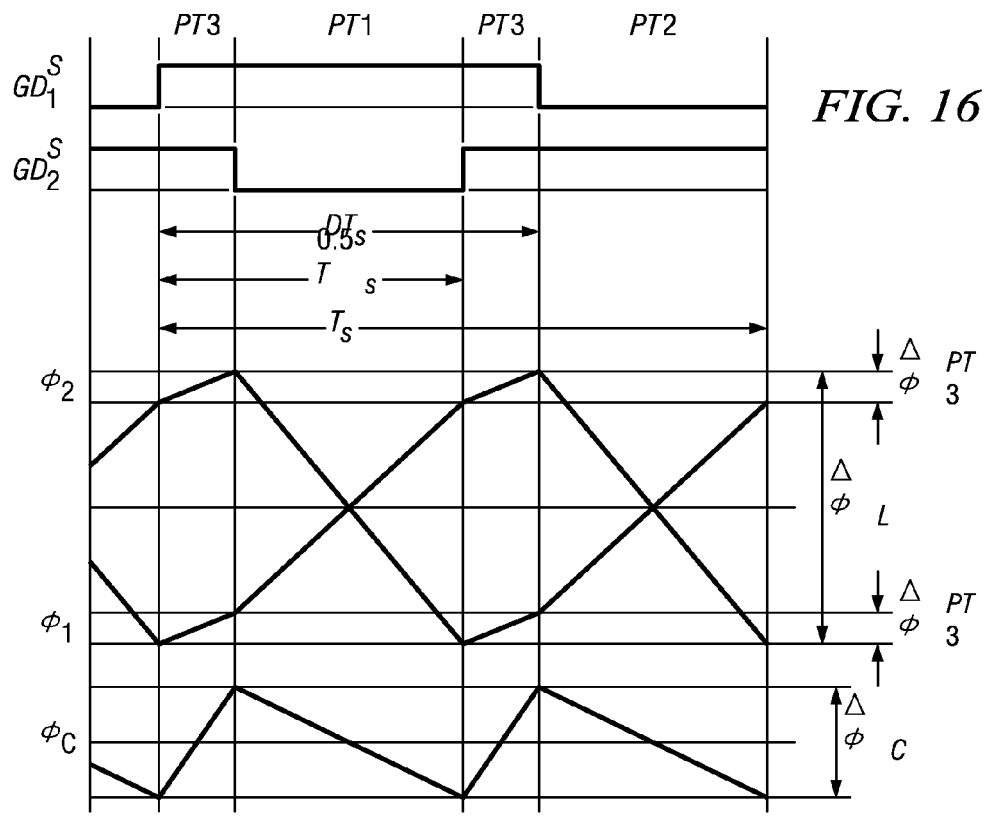

Turning now to FIGS. 15 and 16, illustrated are diagrams of exemplary high-frequency flux components in a common leg of a magnetic core and high-frequency flux components in each of first and second legs of the magnetic core according to the principles of the present invention. FIG. 15 illustrates diagrams of a high-frequency flux component $\phi_C$ in the common leg of the magnetic core and the high-frequency flux components $\phi_1$ and $\phi_2$ in each of the first and second legs of the magnetic core for the case where the duty cycle D of the switches is less than 0.5 according to the principles of the present invention. The high-frequency flux components correspond to the high-frequency duty cycle of the switches. The waveforms do not include the low-frequency component of the flux variations (i.e., the 120 Hz component for 60 Hz ac mains input frequency). At the top of the FIGURE are illustrated the conduction states of the first and second main switches $S_1$ and $S_2$, where an elevated portion of a waveform again indicates that the respective switch is turned on. The first, second and freewheeling power transfer stages PT1, PT2, FW are also indicated at the top of the drawing.

The peak-to-peak value $\Delta\phi_L$ of the waveform of the high-frequency flux component $\phi_L$ for the duty cycle D<0.5 in the first or second legs of the magnetic core is given by the equation:

$$\Delta\phi_L = \frac{1}{(N_s + 2N_c)} \cdot \left(V_{in} + \left(\frac{N_c}{N_s}\right) \cdot V_c\right) \cdot \frac{D}{f_s}.$$

The change in flux $\Delta\phi_{FW}$ in a first or second outer leg during the freewheeling power stage FW is given by the equation:

$$\Delta\phi_{FW} = \frac{1}{N_s + 2N_c} \cdot (V_{in} - V_c) \cdot \frac{(1-2D)}{2f_s},$$

and the peak-to-peak change in flux $\Delta\phi_C$ in the common leg of the magnetic core is given by the equation:

$$\Delta\phi_C = 2\Delta\phi_{FW}.$$

Turning now to FIG. 16, illustrated are diagrams of a high-frequency flux component $\phi_C$ in a common leg of a magnetic core and the high-frequency flux components $\phi_1$ and $\phi_2$ in each of the first and second legs of the magnetic core for the case where the duty cycle D of the switches is greater than 0.5 according to the principles of the present invention. In this case, the first, second and third power transfer stages PT1, PT2, PT3 are illustrated in FIG. 16. For this case, the peak-to-peak value $\Delta\phi_L$ of the waveform of the high-frequency flux component $\phi_L$ in the first or second legs of the magnetic core is given by the equation:

$$\Delta\phi_L = \frac{-1}{(N_s + 2N_c)} \cdot \left(V_{in} - \left(\frac{N_s + N_c}{N_s}\right) \cdot V_c\right) \cdot \frac{1-D}{f_s}.$$

The change in flux $\Delta\phi_{FW}$ in the first or second leg during the freewheeling power transfer stage FW is given by the equation:

$$\Delta\phi_{PT3} = \frac{1}{N_s + 2N_c} \cdot (V_{in}) \cdot \frac{(2D-1)}{2f_s},$$

and the peak-to-peak change in flux $\Delta\phi_C$ in the common leg of the magnetic core is again given by the equation:

$$\Delta\phi_C = 2\Delta\phi_{PT3}.$$

Figure 17:
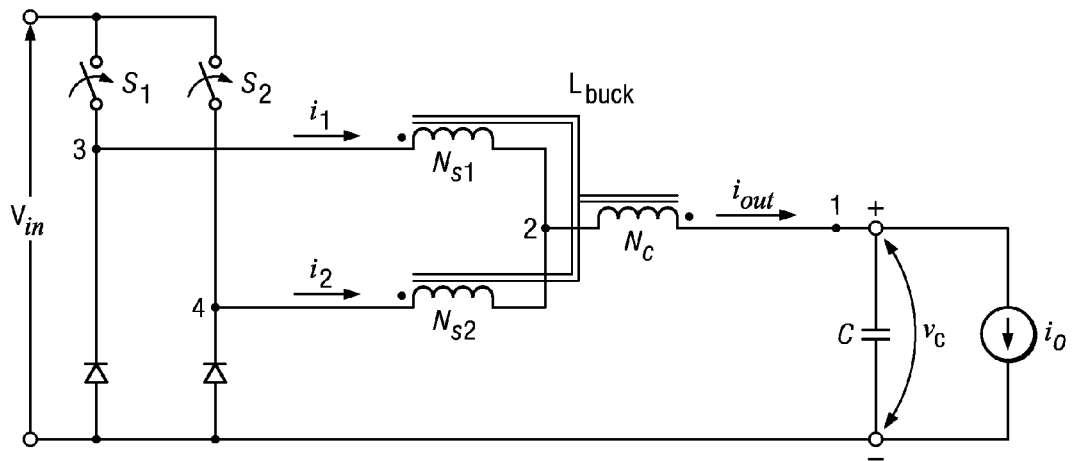
FIGS. 17 and 18 illustrate schematic diagrams of alternative embodiments of portions of power converters constructed according to the principles of the present invention.
Figure 18:
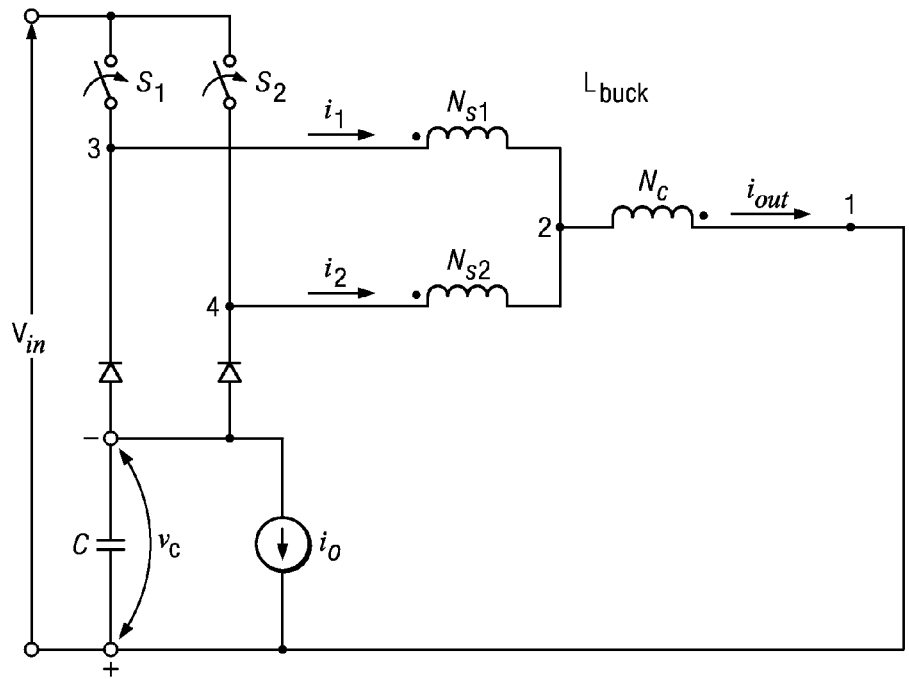

Turning now to FIGS. 17 and 18, illustrated are schematic diagrams of alternative embodiments of portions of power converters constructed according to the principles of the present invention. More specifically, FIG. 17 illustrates a power converter employing buck regulators with a coupled inductor constructed according to the principles of the present invention. FIG. 18 illustrates a power converter employing buck-boost regulators with a coupled inductor constructed according to the principles of the present invention. While the operation of the power converters of FIGS. 17 and 18 differs to accommodate the buck and buck-boost operation, respectively, the principles of the present invention with respect to the interleaved regulators and coupled inductor are analogous to the principles as described above and will not hereinafter be repeated.

Thus, a power train with a coupled inductor for a power converter that provides improved power conversion efficiency has been introduced. A coupled inductor is formed with integrated magnetics with a plurality of electrically and magnetically coupled windings for interleaved regulators, and a common winding electrically and magnetically coupled to the windings. Those skilled in the art should understand that the previously described embodiments of the power converter and related methods of forming a coupled inductor with an integrated magnetic device for a power converter are submitted for illustrative purposes only. Those skilled in the art understand further that various changes, substitutions, and alterations can be made to the boost inductor without departing from the spirit and scope of the invention in its broadest form. For example, a magnetic core can be formed with three or more separate legs coupled to three or more corresponding regulators in the power converter. In such cases, the interleaving architecture would preferably successively shift phases of each regulator by 360 degrees/n, where n is the number of boost regulators. In addition, other embodiments capable of providing the advantages as described above are well within the broad scope of the present invention. As a further example, the auxiliary switches illustrated hereinabove with diodes may be formed using synchronous rectifiers, using techniques well known in the art to substitute an active switching device for a diode. While the coupled inductor and method have been described as providing advantages in the environment of a power converter, other switching topologies and applications therefor such as a switching regulator for a motor or other electromechanical device are well within the broad scope of the present invention.

For a better understanding of power electronics, see "Principles of Power Electronics," by J. G. Kassakian, M. F. Schlecht and G. C. Verghese, Addison-Wesley (1991). For a better understanding of semiconductor devices and processes, see "Fundamentals of III-V Devices," by William Liu, John Wiley and Sons, (1999). For a better understanding of gallium arsenide processing, see "Modern GaAs Processing Methods," by Ralph Williams, Artech House, Second Ed. (1990). The aforementioned references are incorporated herein by reference.

Additionally, for examples of power supplies, see U.S. Patent Application Publication No. 2005/0024179, entitled "Extended E Matrix Integrated Magnetics (MIM) Core," to Chandrasekaran, et al., filed Aug. 19, 2004 and published Feb. 3, 2005, U.S. Pat. No. 6,775,159, entitled "Switching Power Converter Circuits Providing Main and Auxiliary Output Voltages," to Webb, et al., issued Aug. 10, 2004, U.S. Pat. No. 6,549,436, entitled "Integrated Magnetic Converter Circuit and Method with Improved Filtering," to Sun, issued Apr. 15, 2003, U.S. Pat. No. 7,046,523, entitled "Core Structure and Interleaved DC-DC Converter Topology," to Sun, et al., issued May 16, 2006, U.S. Pat. No. 7,012,414, entitled "Vertically Packaged Switched-Mode Power Converter," to Mehrotra, et al., issued Mar. 14, 2006, U.S. Patent Application Publication No. 2006/0187684, entitled "Power Converter Employing Integrated Magnetics with a Current Multiplier Rectifier and Method of Operating the Same," to Chandrasekaran, et al., filed Feb. 8, 2006 and published Aug. 24, 2006, U.S. Pat. No. 7,176,662, entitled "Power Converter Employing a Tapped Inductor and Integrated Magnetics and Method of Operating the Same," to Chandrasekaran, issued Feb. 13, 2007, and U.S. Patent Application Publication No. 2006/0198173, entitled "Control Circuit for a Depletion Mode Switch and Method of Operating the Same," to Rozman, filed Feb. 23, 2006 and published Sep. 7, 2006, all of which are incorporated herein by reference.

Also, although the present invention and its advantages have been described in detail, it should be understood that various changes, substitutions and alterations can be made herein without departing from the spirit and scope of the invention. For example, many of the integrated boost inductors discussed above can be implemented in different methodologies and replaced by other processes, or a combination thereof, to form the devices providing improved efficiency for a power converter as described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power train for a power converter, comprising:
    a coupled inductor, including:
        a magnetic core with a common leg, a first leg and a second leg,
        a common winding formed around said common leg and coupled between a first node and a second node,
        a first winding formed around said first leg and coupled between said second node and a third node, and
        a second winding formed around said second leg and coupled between said second node and a fourth node;
    a first regulator including a first main switch having a non-control terminal coupled to said third node; and
    a second regulator including a second main switch having a non-control terminal coupled to said fourth node.

2. The power train as recited in claim 1 wherein said first regulator includes a first diode.

3. The power train as recited in claim 1 wherein said first regulator includes a first diode coupled to said third node.

4. The power train as recited in claim 1 wherein said second regulator includes a second diode.

5. The power train as recited in claim 1 wherein said second regulator includes a second diode coupled to said fourth node.

6. The power train as recited in claim 1 wherein said first regulator includes a first diode and said second regulator includes a second diode.

7. The power train as recited in claim 1 wherein said first leg is a first outer leg and said second leg is a second outer leg.

8. The power train as recited in claim 1 further comprising an output filter capacitor coupled to said first regulator and said second regulator.

9. The power train as recited in claim 1 wherein said first winding and said second winding have an equal number of turns.

10. The power train as recited in claim 1 wherein said magnetic core includes a gap formed between an upper surface of said common leg and a lower surface of an upper cross-member of said magnetic core.

11. A method of forming a power train for a power converter, comprising:
    forming a coupled inductor, including:
        providing a magnetic core with a common leg, a first leg and a second leg,
        forming a common winding around said common leg and coupled between a first node and a second node,
        forming a first winding around said first leg and coupled between said second node and a third node, and
        forming a second winding around said second leg and coupled between said second node and a fourth node;
    coupling a non-control terminal of a first main switch of a first regulator to said third node; and
    coupling a non-control terminal of a second main switch of a second regulator to said fourth node.

12. The method as recited in claim 11 further comprising coupling a first diode to said first main switch of said first regulator.

13. The method as recited in claim 11 further comprising coupling a first diode to said third node.

14. The method as recited in claim 11 further comprising coupling a second diode to said second main switch of said second regulator.

15. The method as recited in claim 11 further comprising coupling a second diode to said fourth node.

16. The method as recited in claim 11 further comprising coupling a first diode to said first main switch of said first regulator and coupling a second diode to said second main switch of said second regulator.

17. The method as recited in claim 11 wherein said first leg is a first outer leg and said second leg is a second outer leg.

18. The method as recited in claim 11 further comprising coupling an output filter capacitor to said first regulator and said second regulator.

19. The method as recited in claim 11 wherein said first winding and said second winding have an equal number of turns.

20. The method as recited in claim 11 further comprising forming a gap between an upper surface of said common leg and a lower surface of an upper cross-member of said magnetic core.

21. A power converter, comprising:
    a power train for a power converter, including:
        a coupled inductor, including:
            a magnetic core with a common leg, a first leg and a second leg,
            a common winding formed around said common leg and coupled between a first node and a second node,
            a first winding formed around said first leg and coupled between said second node and a third node, and
            a second winding formed around said second leg and coupled between said second node and a fourth node,
        a first regulator including a first main switch having a non-control terminal coupled to said third node, and
        a second regulator including a second main switch having a non-control terminal coupled to said fourth node; and
    a controller configured control a duty cycle of said first main switch and said second main switch to regulate an output voltage of said power converter.

22. The power converter as recited in claim 21 wherein said first regulator includes a first diode coupled to said third node.

23. The power converter as recited in claim 21 wherein said second regulator includes a second diode coupled to said fourth node.

24. The power converter as recited in claim 21 wherein said duty cycle of said first and second main switches is less than 0.5.

25. The power converter as recited in claim 21 wherein said first regulator includes a first diode and said second regulator includes a second diode.

26. The power converter as recited in claim 21 wherein said first leg is a first outer leg and said second leg is a second outer leg.

27. The power converter as recited in claim 21 wherein said power train further includes an output filter capacitor coupled to said first regulator and said second regulator.

28. The power converter as recited in claim 21 wherein said first winding and said second winding have an equal number of turns.

29. The power converter as recited in claim 21 wherein said magnetic core includes a gap formed between an upper surface of said common leg and a lower surface of an upper cross-member of said magnetic core.

30. The power converter as recited in claim 21 further comprising a rectifier bridge coupled to said coupled inductor.

31. A method of operating a power converter, comprising:
providing a coupled inductor, coupled to said input, including:
a magnetic core with a common leg, a first leg and a second leg,
a common winding formed around said common leg and coupled between a first node and a second node,
a first winding formed around said first leg and coupled between said second node and a third node, and
a second winding formed around said second leg and coupled between said second node and a fourth node, and
controlling a duty cycle of a first main switch, having a non-control terminal coupled to said third node, of a first regulator and a second main switch, having a non-control terminal coupled to said fourth node, of a second regulator to provide power transfer stages of said power converter.

32. The method as recited in claim 31 wherein said controlling provides a continuous conduction mode of operation for said power converter.

33. The method as recited in claim 31 wherein said power transfer stages include:

a first power transfer stage wherein said first main switch is conducting and said second main switch is non-conducting;
a second power transfer stage wherein said first main switch is non-conducting and said second main switch is conducting;
a third power transfer stage wherein said first and second main switches are conducting; and
a freewheeling power transfer stage wherein said first and second main switches are non-conducting.

34. The method as recited in claim 31 wherein said controlling includes controlling a first diode, coupled to said third node, of said first regulator and a second diode, coupled to said fourth node, of said second regulator.

35. The method as recited in claim 31 wherein said duty cycle of said first and second main switches is less than 0.5.

36. The method as recited in claim 31 wherein said first leg is a first outer leg and said second leg is a second outer leg.

37. The method as recited in claim 31 further comprising filtering an output voltage from said first regulator and said second regulator.

38. The method as recited in claim 31 wherein said first winding and said second winding have an equal number of turns.

39. The method as recited in claim 31 wherein said magnetic core includes a gap formed between an upper surface of said common leg and a lower surface of an upper cross-member of said magnetic core.

40. The method as recited in claim 31 further comprising a rectifying an input voltage of said power converter.

* * * * *